No. 682,425. Patented Sept. 10, 1901.
F. B. RAY & O. S. BRANDT.
SADDLE FOR BICYCLES, &c.
(Application filed Sept. 2, 1899. Renewed Feb. 26, 1901.)
(No Model.) 2 Sheets—Sheet 1.
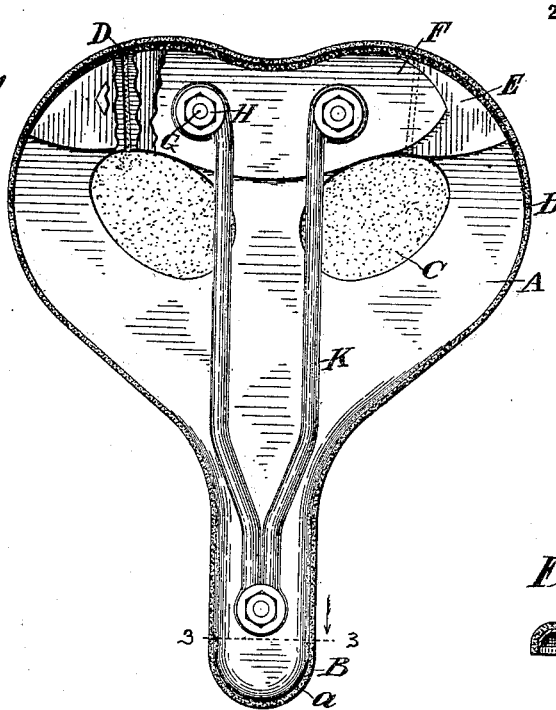
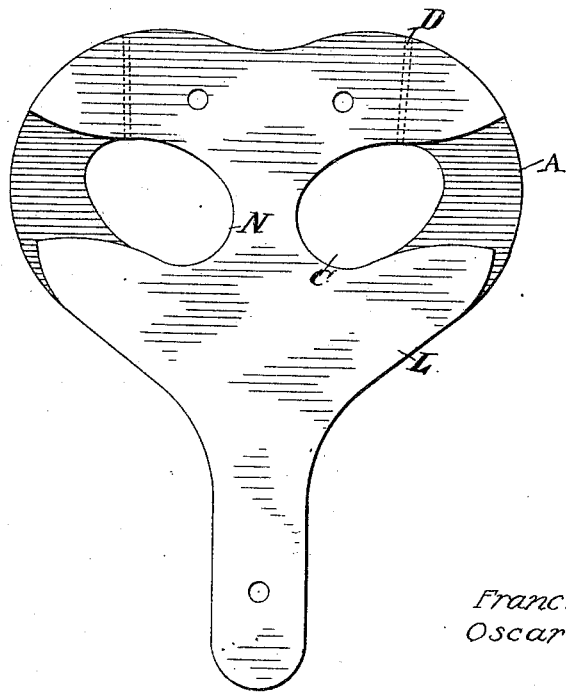
Francis B. Ray.
Oscar S. Brandt
Inventors.
Witnesses
Geo. B. Rowley.
Peter F. Smock.
By their Attorney No. 682,425. Patented Sept. 10, 1901.
F. B. RAY & O. S. BRANDT.
SADDLE FOR BICYCLES, &c.
(Application filed Sept. 2, 1899. Renewed Feb. 26, 1901.)
(No Model.)
2 Sheets—Sheet 2.
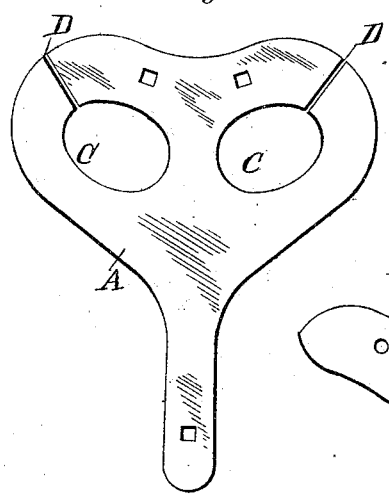
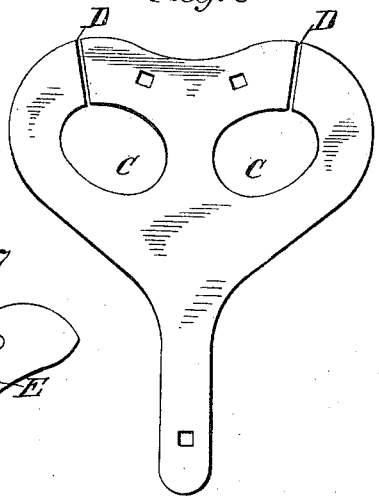
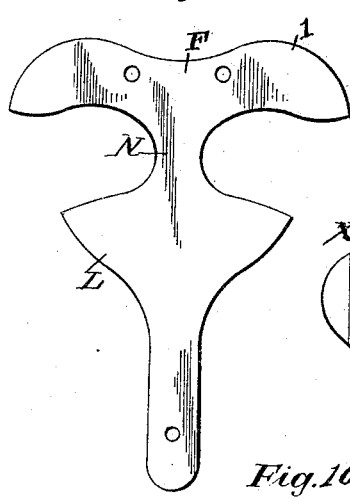
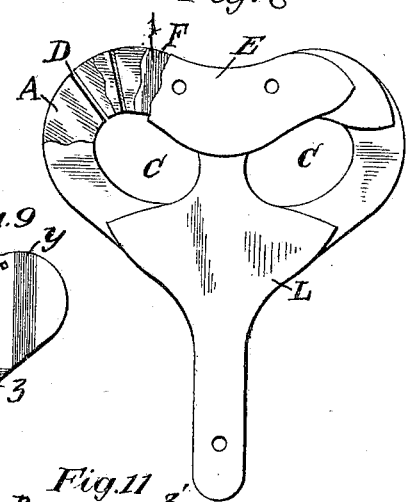
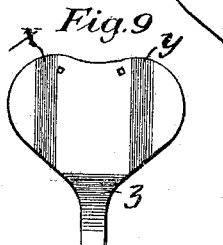
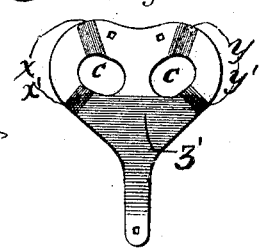
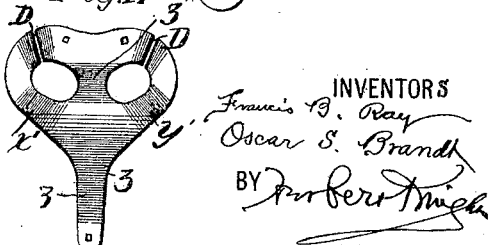
WITNESSES:
INVENTORS
Francis B. Ray
Oscar S. Brandt
BY
ATTORNEY

UNITED STATES PATENT OFFICE.

FRANCIS B. RAY AND OSCAR S. BRANDT, OF NEW YORK, N. Y.

SADDLE FOR BICYCLES, &c.

SPECIFICATION forming part of Letters Patent No. 682,425, dated September 10, 1901.

Application filed September 2, 1899. Renewed February 26, 1901. Serial No. 48,987. (No model.)

*To all whom it may concern:*

Be it known that we, FRANCIS B. RAY and OSCAR S. BRANDT, citizens of the United States, residing in the borough of Manhattan, city of New York, county and State of New York, have invented certain new and useful Improvements in Saddles for Bicycles, Tricycles, &c., of which the following is a specification.

Our invention relates to a saddle adapted for bicycles, tricycles, &c., provided with a base consisting of one or more spring-plates, the special invention herein consisting in means for eliminating the torsional strain on said plate or plates, at the same time preserving all other valuable characteristics, and to do this we have discovered that it is necessary to provide intervening slots or cut-away portions in the plates, so as to break their continuity. By this means instead of the plates being affected by an irresistible torsional strain, resulting in breakages, the cut-away portions are provided to take up the twisting movement and permit the plate to discharge its required functions without being subjected to the strain aforesaid. In other words, the slots or openings allow the plates to separate at these places when bending, and especially when bending to a great extent. Our invention also relates to the bridging of these intervening slots or cut-away portions by one or more superimposed plates or bridge-pieces, long or short, as may be preferred, and also to two or more plates having slots or cut-away portions which do not register, but are, on the contrary, staggered, whereby and through means of which the efficacy of the invention is increased, as well as the strength of the saddle maintained. As a necessary feature of our saddle we cut out the saddle-plates at each side of the median line of the saddle, forming thereby openings in the saddle-plate to increase its flexibility and accommodate the tuberosities of the pelvic bone.

We will now proceed to describe our invention more particularly in connection with the accompanying drawings, which form a part of this specification, and in which—

Figure 1 represents an underside plan view, partly cut away, of one form of our invention. Fig. 2 represents a similar view of another form, showing the plates only. Fig. 3 is a cross-section on the line 3 3, Fig. 1. Fig. 4 shows a base-plate having the slots or cut-away portions extending from the outside edge of the plate to the openings of said plate. Fig. 5 is a similar view of a similar plate, the slots or cut-away portions being placed differently. Fig. 6 is another form of plate provided and employed to give greater flexibility. Fig. 7 is a bridging-plate. Fig. 8 represents the assembled and composite base-plate, consisting of the parts shown in Figs. 4, 5, 6, and 7. Fig. 9 is a view, to a smaller scale, of an illustrative solid piece or spring-plate, showing the lines where the bending of such a plate would occur, if employed. Fig. 10 shows where the bending would occur where the openings on each side of the median line are employed, but without the slots or cut-away portions. Fig. 11 shows where bending will occur where the slots are introduced.

In the drawings, A represents the upper member of two or more spring-plates, forming, with the other member or members, a species of leaf-spring. In the present case we have shown the member A coextensive at its periphery with the superimposed saddle-pad or saddle proper, B, or rather it lies just within the rim of the saddle and beneath it and constitutes when in place a part of the saddle apparatus. The plate A may be bent over and down, as at $a$. This bent-over portion serves two purposes—to strengthen the spring-plate and to maintain the integrity more efficiently of the saddle contour.

At C C are shown openings which serve to impart greater flexibility to the outer edges of the spring-plates and also to accommodate, in a sense, the tuberosities of the pelvic bone. In this form of saddle there is a tendency, in response to unusual strains, for the web of the spring-plate A, which lies between said opening C and the outer edge of the plate, to yield and break as a result of the torsional strains aforesaid. We make allowance for this condition and have introduced and provided slots or cut-away portions D, as shown. When these strains occur, the spring-plate instead of breaking will give and take along the lines of these openings or slots, and breakages will be prevented.

We have introduced Figs. 9, 10, and 11 to illustrate and explain the strains to which the plates are subjected while in use. In case of a perfectly plain surface, such as shown in Fig. 9, the lines of bending would occur, as indicated at $x\ y\ z$. Where the openings C C are provided, as shown in Fig. 10, the lines would shift position, and finally, as in Fig. 11, where in connection with the openings C C we provide the slots or cut-away portions D, the bendings would take place at $x'$, $y'$, $z$, and $z'$, the slots D permitting the plates to give at these points, creating thereby an ease of movement and flexibility of structure and eliminating the possibility of breakage of the plates when under strain. In other words, if we form the saddle-base of a solid piece of spring-plate, as shown in Fig. 9, the rider's weight will cause the plate to bend down laterally at each side or wing, as at $x\ y$. Between these points there can be no cross-bending. What little there is is confined to the pommel, as at $z$. If we provide the openings C C in the plate, as in Fig. 10, the lateral bending occurs in an antagonistic manner diagonally, as at $x\ x'\ y\ y'$, and the cross-bending is brought nearer to the center, and at $z'$ it alternates with the lateral bending. This, combined with the antagonistic lateral bending, produces a twisting or torsional movement which soon destroys the texture of the metal and causes fracture. By providing the slots D in the plate, as shown in Fig. 11, the wings are allowed to expand, and the torsional strain is relieved, the cross-bending extends nearly the whole length, and the plate is free to adapt itself to the varying weight without breaking. In order, however, to strengthen the plate at such points where the cut-away portions occur, we have introduced our bridge-pieces or supplementary plates E F, which extend along at the rear part of the saddle contiguous to the cantle and immediately beneath the main plate A, being secured thereto by means of bolts G and nuts H, which also are utilized to fasten the ordinary bow-shaped securing-spring K.

In the form shown in Fig. 2 two plates or members A L are utilized. These plates lie contiguous to each other, and both extend longitudinally the entire length of the saddle, the plate A being provided with the slots or cut-away portions D and the plate L with larger openings N. The plates, however, overlap, so that as a result we have upon the periphery of the spring structure a continuous metallic spring-support. We may employ the two plates A L shown in this figure or only one plate A, as shown in Figs. 1 and 3, or we may employ the plates shown in Figs. 4, 5, and 6, and in combination therewith the bridge-plate E, as shown in Fig. 8. In this case the rear arm $l$ of the plate L serves as a secondary bridge-plate and extends beyond and bridges the openings D of the plate A. (Shown in Fig. 4.) These forms may be changed at pleasure according to conditions, strength of material, size and conformation of saddle, weight of rider, texture of the spring metal, &c., and two plates may be used, or three or four, and the intervening slots or cut-away portions may be enlarged or reduced or arranged in any desired way to produce a particular result, the modifications necessary to secure all the desired and delicately-varying forms being manifold.

Having thus described our invention, the following is what we claim as new therein and desire to secure by Letters Patent:

1. A bicycle-saddle having a spring-plate base, openings or cut-away portions to take up torsional strains, and one or more bridging-plates, as and for the purposes set forth.

2. A bicycle-saddle having a spring-plate base composed of two or more leaves, openings or cut-away portions to take up torsional strains, and bridging-plates, as and for the purposes set forth.

3. A bicycle-saddle having two or more spring-plates lying contiguous to one another as shown, the said plates having cut-away portions or slots to provide for torsional action, the said cut-away portions being arranged in staggered form, as and for the purposes set forth.

FRANCIS B. RAY.
OSCAR S. BRANDT.

Witnesses:
HERBERT KNIGHT,
PETER F. SONNEK.